United States Patent [19]

Lund

[11] Patent Number: 5,219,181
[45] Date of Patent: * Jun. 15, 1993

[54] ANTI-ROLL SYSTEM WITH TILT LIMITATION

[75] Inventor: Mark A. Lund, Escondido, Calif.

[73] Assignee: TLC Suspension, Chula Vista, Calif.

[ * ] Notice: The portion of the term of this patent subsequent to Oct. 30, 2007 has been disclaimed.

[21] Appl. No.: 716,655

[22] Filed: Jun. 14, 1991

Related U.S. Application Data

[63] Continuation-in-part of Ser. No. 397,723, Aug. 23, 1989, Pat. No. 4,966,390.

[51] Int. Cl.$^5$ .............................................. B62D 9/02
[52] U.S. Cl. ................... 280/772; 280/112.2; 280/689; 280/707
[58] Field of Search ...................... 280/772, 112.2, 684, 280/707; 138/30

[56] References Cited

U.S. PATENT DOCUMENTS 4,966,390 10/1990 Lund et al. ........................... 280/772
5,094,271 3/1992 Fritz et al. ............................. 138/30

*Primary Examiner*—Kenneth R. Rice
*Attorney, Agent, or Firm*—Baker, Maxham, Jester & Meador

[57] ABSTRACT

An anti-roll system for turn compensation in a vehicle generates a differential hydraulic signal in which a pressurizing potential corresponds to a first curve direction and a complementary return hydraulic potential. The system includes a pair of rear wheel cylinder and piston assemblies and a pair of front wheel cylinder and piston assemblies. A hydraulic circuit is connected to conduct the pressurizing potential to move the pistons in a first rear wheel cylinder and piston assembly and a first front wheel cylinder and piston assembly, while conducting the return signal to move the pistons in second front wheel cylinder and piston assembly and a second rear wheel cylinder and piston assembly. A hydraulic conductor directly connects corresponding ends of the rear wheel cylinder and piston assemblies to provide a hydraulic conduction between those assemblies in response to conduction of the differential hydraulic signal. A tilt limitation feature is provided in the front wheel cylinder and piston assemblies and is connected to the hydraulic circuit for limiting the maximum displacement of the pistons in the rear and front wheel cylinder and piston assemblies. In a vehicle, the system reacts to a turn by causing the front and rear wheel cylinder and piston assemblies to tilt the vehicle in a direction to counteract the vehicle rolling force caused by the turn. The tilt-limitation element operates to limit the amount of tilt produced by the system of the invention to counteract vehicle roll force.

19 Claims, 7 Drawing Sheets

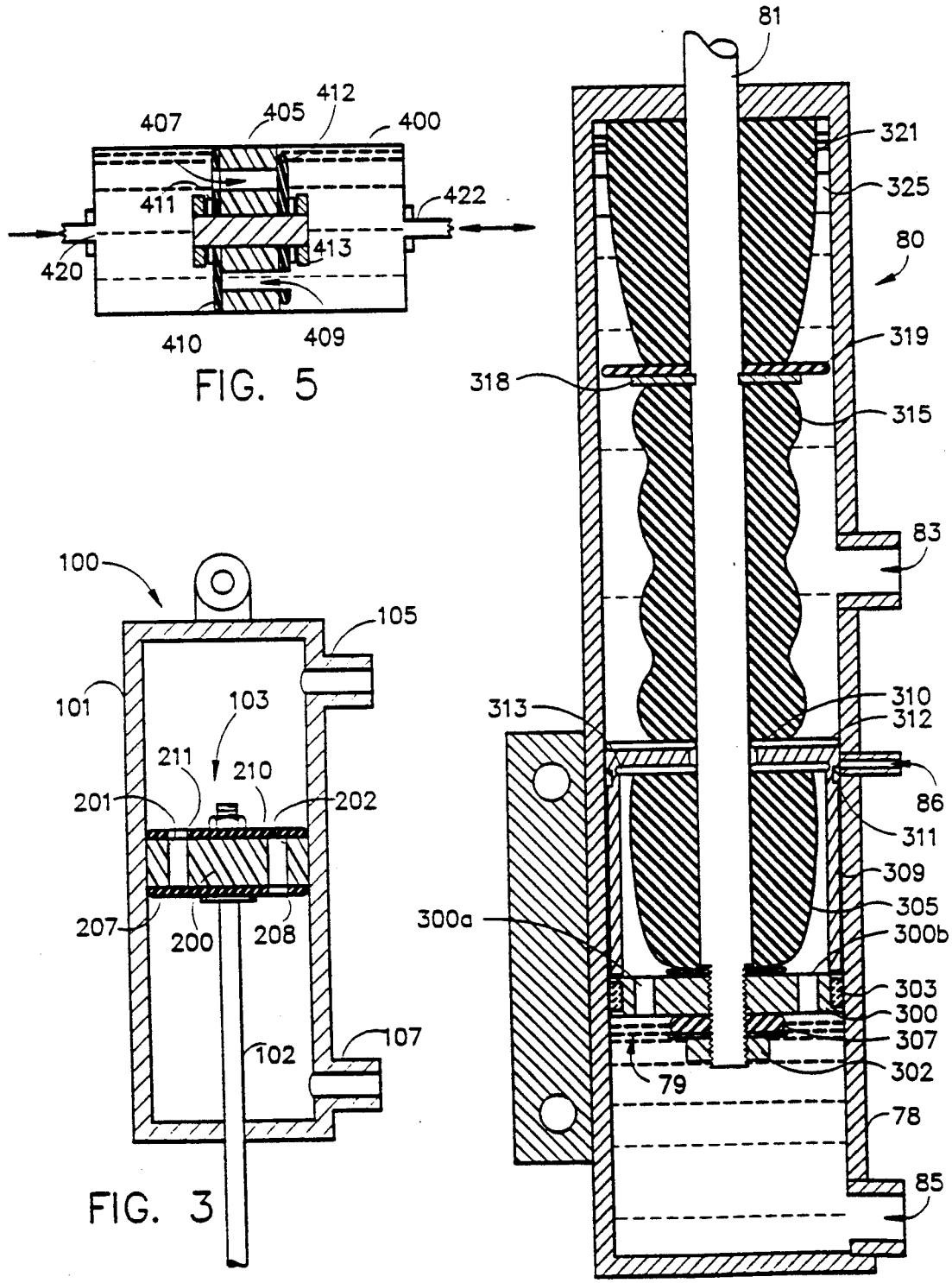

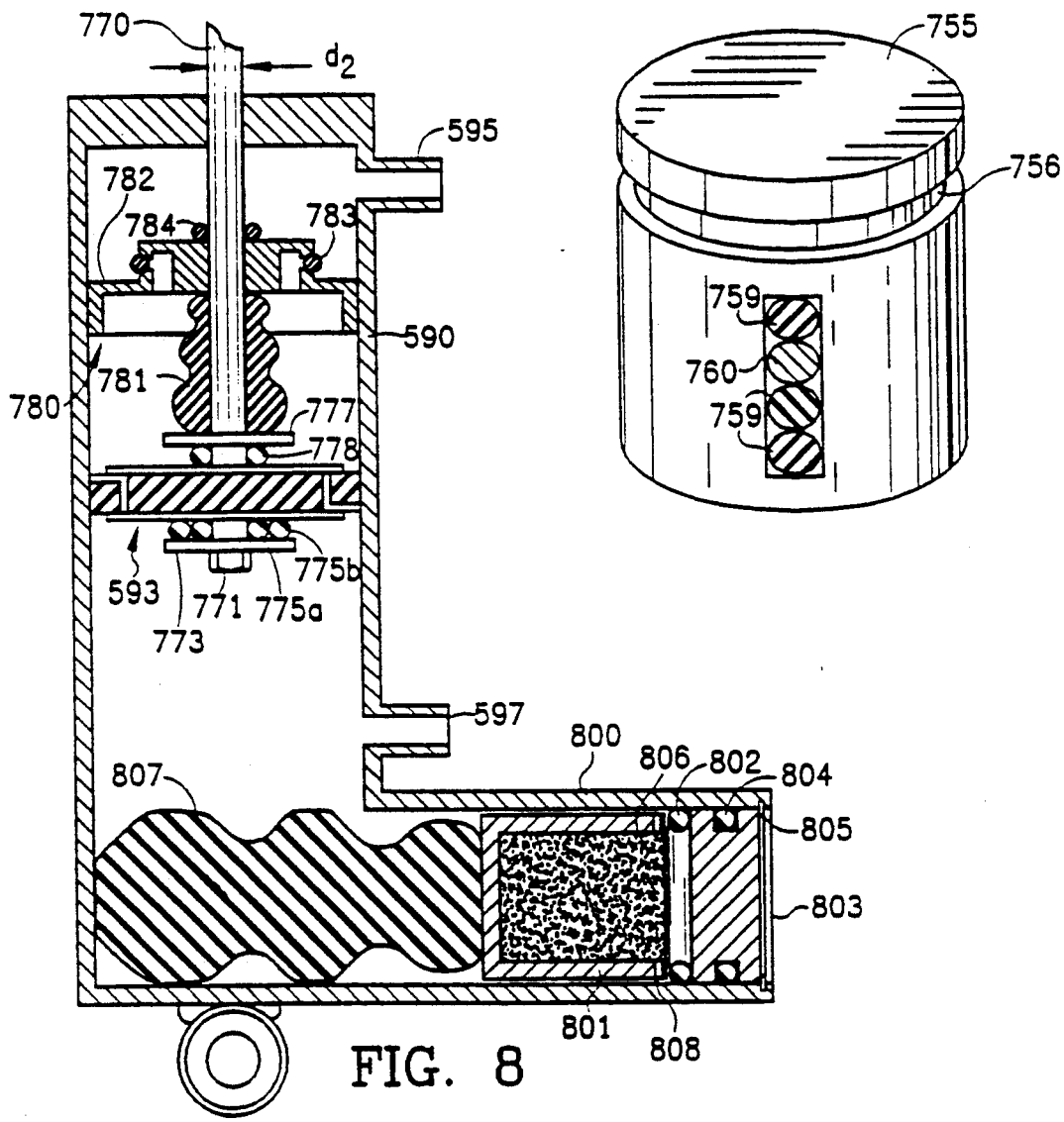
FIG. 7B
FIG. 8
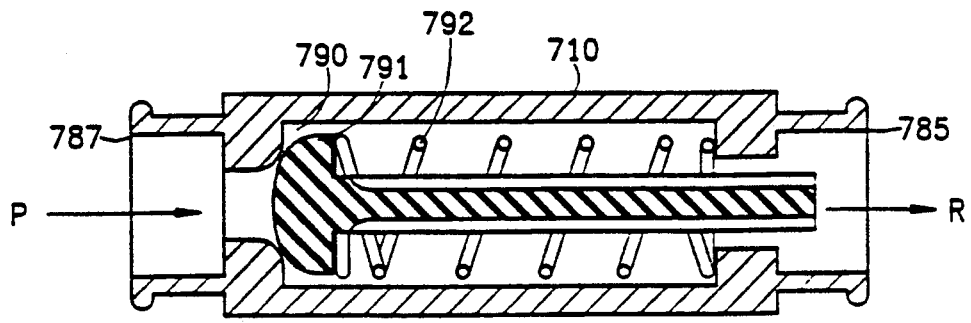
FIG. 9

ANTI-ROLL SYSTEM WITH TILT LIMITATION

CROSS REFERENCE TO RELATED APPLICATION

This application is a continuation-in-part of U.S. patent application Ser. No. 07/397,723, filed Aug. 23, 1989, now U.S. Pat. No. 4,966,390, assigned to the assignee of this application.

BACKGROUND OF THE INVENTION

The present invention relates to a vehicle anti-roll system, and more particularly, to a hydraulically-operated anti-roll system which limits the amount of tilt induced in a vehicle to counteract turn-induced roll.

For the purpose of establishing the general environment in which the invention operates, it is asserted that a vehicle such as an automobile consists of a body, four tires, two front and two rear, a frame with axles for mounting the front and rear wheels, and a suspension for connecting the vehicle body to the axles.

When a vehicle turns, the suspension permits the vehicle body to rotate slightly about its longitudinal axis in response to the rolling force exerted on the body during the turn. Typically, vehicle passengers experience this effect as a tilt of the vehicle body, with the side of the body on the outside of the curve being relatively lower than the side of the body on the inside. Further, the vehicle body tends to pitch forward so that the front of the body is relatively lower than the rear. The pitch and roll combine to incline the vehicle body toward the front corner on the outside of the turn.

Anti-roll systems are known in the art which counteract vehicle roll by providing a lifting force acting between the vehicle body and suspension on the outside of the curve or a vehicle lowering force acting between the body and suspension on the inside turn side of the vehicle. Some anti-roll systems in the art provide complementary lifting and lowering forces simultaneously.

U.S. Pat. No. 3,752,497 of Enke et al illustrates an anti-roll system in which complementary lifting and lowering forces are applied. In the Enke et al patent, two sets of complementary lifting and lowering forces are provided, one set to the front wheels, and one set to the rear.

In U.S. Pat. No. 3,820,812 of Stubbs, an anti-roll system includes two separate assemblies, each working on the front and rear axles on a respective side of a vehicle. Each assembly provides a lifting or lowering force to its respective side, without reference to the action of the other assembly.

U.S. Pat. No. 3,885,809 of Pitcher illustrates an anti-roll system in which two separate correction units on opposite sides of the vehicle provide lifting and lowering forces to counteract roll. The Pitcher anti-roll system also includes a lift limitation assembly interconnected with the anti-roll system components and serving the rear of the vehicle.

U.S. Pat. No. 4,345,661 of Nishikawa provides a correcting force to one side of a vehicle to counteract turn-induced roll.

My U.S. Pat. No. 4,589,678 operates on the front wheels to counteract roll. It also provides limitation of front wheel correction by means of a piston controlled hydraulic line operating between a hydraulic reservoir and a cylinder and piston assembly.

All of these existing anti-roll systems utilize hydraulic circuitry and components for generating lifting and lowering forces. In each case, an element corresponding to a cylinder and piston assembly is positioned at a vehicle wheel and acts between the wheel and the vehicle body by moving a piston within a cylinder. Movement of the piston toward the top of the cylinder compresses the assembly's longitudinal profile and exerts a lowering force by drawing together the vehicle body and the wheel. Movement of the piston downwardly in the cylinder spreads the assembly longitudinally and exerts an erecting force which separates the body and the wheel. The operations of a plurality of such assemblies are coordinated by hydraulic circuitry. The circuitry reacts to roll forces by developing hydraulic signals in the form of pressurized hydraulic fluid, and delivering those signals in appropriate configurations to the cylinder and piston assemblies. None of the instances cited above provides a closed hydraulic circuit which connects all four front and rear cylinder and piston assemblies into an integrated anti-roll system in which all of the parts act cooperatively and in response to a single hydraulic signal. Beyond not teaching this combination, these references further do not suggest the joinder of such an anti-roll system with a tilt limitation feature which limits the degree of correcting tilt developed at all four wheels to counteract vehicle rolling. Neither do these references illustrate shock absorbency internal to the hydraulic components of an anti-roll system.

SUMMARY OF THE INVENTION

The inventor has observed that the counteracting response of a hydraulically-actuated anti-roll system to vehicle roll forces is measureably enhanced by provision of the capability, on each side of the vehicle, to limit the amount of tilt correction induced by the system.

The invention is a system for roll compensation in a vehicle having front and rear wheels, means for rotatably supporting these wheels, a vehicle body, and a suspension connecting the body and the wheels. The anti-roll system of the invention includes a valved hydraulic signal generator for providing a differential hydraulic signal indicative of vehicle roll. The differential hydraulic signal is defined by a pressurizing hydraulic potential corresponding to a first turn direction and a return hydraulic potential corresponding to a second turn direction. A first pair of cylinder and piston assemblies are provided for roll correction at the rear wheels, and a second pair of cylinder and piston assemblies are provided for roll correction at the front wheels. The system includes a hydraulic circuit connected to the valved hydraulic signal generator and to the rear and front wheel cylinder and piston assemblies for conducting the differential hydraulic signal to all of the cylinder and piston assemblies. In conducting the hydraulic signal, the circuit provides the pressurizing potential of the hydraulic signal to move the pistons in a first front wheel assembly and a first rear wheel assembly in a first correcting direction, while providing the return potential to move the pistons in the second front wheel assembly and the second rear wheel assembly in a second correcting direction. A hydraulic conductor directly connects corresponding ends of the rear wheel cylinder and piston assemblies to support hydraulic conduction between these assemblies in response to conduction of the differential hydraulic signal to all of the cylinder and piston assemblies. The system includes a tilt-limitation means connected to the hydraulic circuit for limiting the maximum displacement of the pistons in the front wheel cylinder and piston assemblies which limits the amount of roll correction afforded by the system.

A principal object of this invention is to provide an improved anti-roll system for a vehicle.

A distinct advantage of the described anti-roll system is found in the limitation of the amount of corrective tilt introduced.

Other features of this invention, described below, also permit standard shock-absorbing suspension functions to be performed in response to vertical disturbances, such as jounce and rebound, without disturbing, or requiring operation of, the anti-roll function of this invention.

Other objects and distinct advantages of this invention will become evident when the following description is read with reference to the below-described drawings.

DESCRIPTION OF THE DRAWINGS

FIG. 3 is a side cutaway view illustrating a rear wheel cylinder and piston assembly used in the embodiment of FIG. 1 with an internal, hydraulically-operated shock absorption provision.

FIG. 4 is a side cutaway view showing a front wheel cylinder and piston assembly used in the embodiment of FIG. 1 with an internal, hydraulically-actuated shock absorption provision.

FIG. 5 illustrates a damper assembly interposed between the two rear wheel cylinder and piston assemblies of FIG. 1.

FIG. 7B is a perspective view of a floating piston in the assembly illustrated in FIG. 7A.

FIG. 8 is a side cutaway view illustrating a rear wheel cylinder and piston assembly used in the embodiment of FIG. 6.

FIG. 9 is a side cutaway view of a back pressure valve used in the embodiment of FIG. 6.

DESCRIPTION OF THE PREFERRED EMBODIMENT

Figure 1:
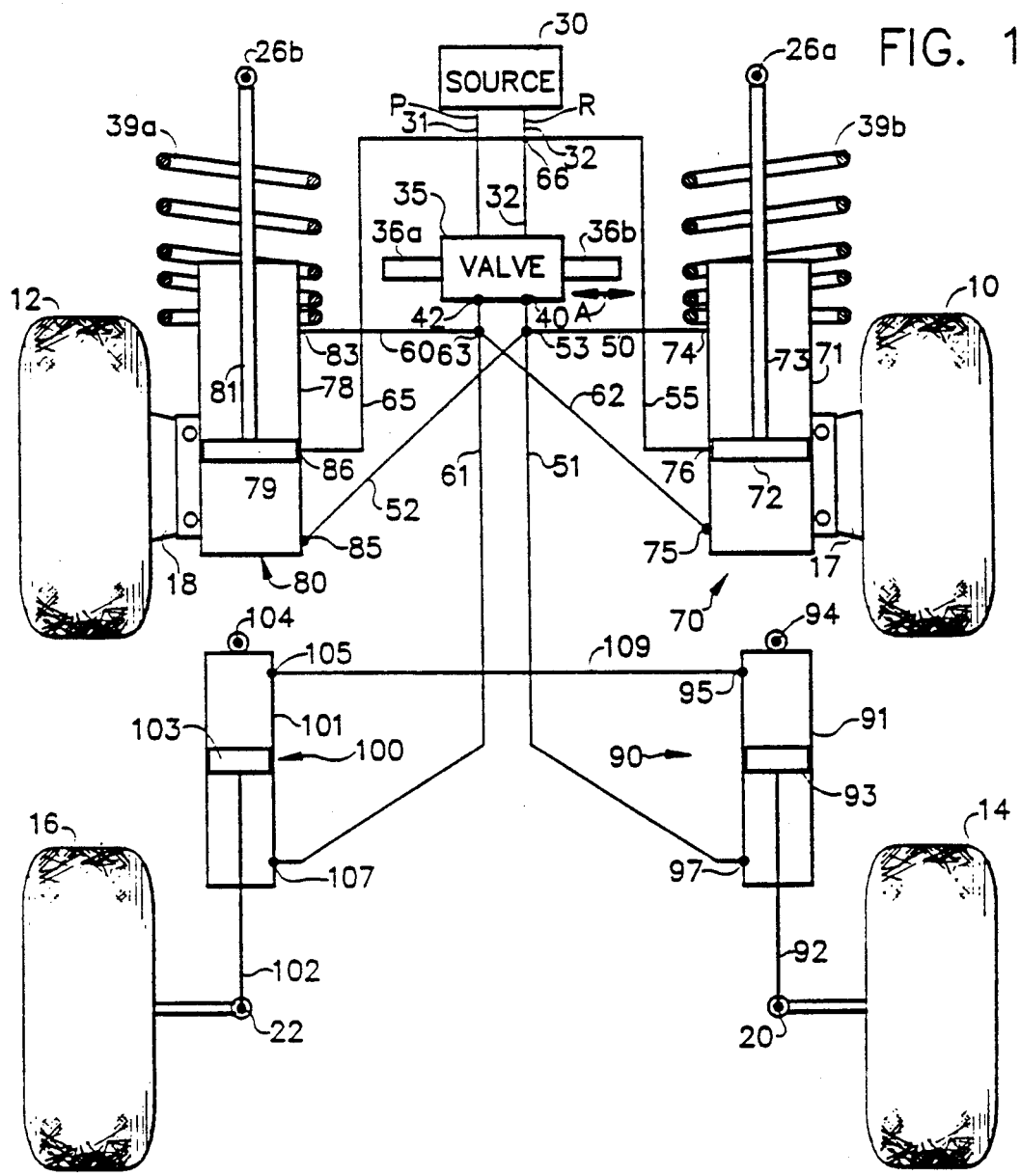
FIG. 1 is a hydraulic circuit representation demonstrative of a first embodiment of the invention.

Referring to FIG. 1, the schematic representation of an automobile includes a pair of front wheels 10 and 12, a pair of rear wheels 14 and 16, and a frame with front axles for rotatably mounting the front wheels 10 and 12. The front axles include attachment points 17 and 18. The frame also includes rear axles for rotatably mounting the rear wheels 14 and 16, the rear axles having real axle mounting points 20 and 22. The frame, the vehicle body which is attached to the frame, and the suspension system which is attached to the body and to the frame, are not illustrated explicitly in FIG. 1. However, the mechanical interconnection of these parts with those illustrated in FIG. 1 and already described above is well known to the skilled artisan.

A hydraulic signal generator includes a conventional hydraulic pump 30 that continuously pumps hydraulic fluid under pressure. In the description which follows, the pumped, pressurized hydraulic fluid is referred to as a "differential signal" and includes complementary pressurizing (P) and return (R) potentials provided, respectively, through hydraulic lines 31 and 32. The hydraulic pump 30 is connected through the lines 31 and 32 to a conventional solenoid-operated, hydraulic spool valve 35, which includes a spool (not shown) and solenoid coils 36a and 36b for positioning the spool. The valve is anchored to the frame. The valve 35 can comprise, for example, a standard, electrically actuated, double acting, four-way free flow device which receives and forwards the R and P potentials produced by the hydraulic pump 30 with a polarity determined by the position of the spool 36. As is known, the spool can be moved within the valve 35 from a rest position in either of the directions indicated by the arrow A. At the rest position, the spool blocks the hydraulic signal from being transmitted by the valve. Movement in one direction provides the potentials P and R in one polarity. Movement of the spool in the opposite direction reverses the polarity of the potentials.

The valve 35 provides the differential hydraulic signal through ports 40 and 42. Hydraulic lines 50, 51, and 52 are connected in common to port 40 at node connector 53. Hydraulic lines 60, 61, and 62 are connected in common to valve port 42 through the node connector 63. A first front wheel cylinder and piston assembly 70 includes a cylinder 71 a piston assembly 72 and a piston shaft 73. The piston shaft 73 is connected at one end to the right front portion of the vehicle body at 26a. The cylinder 71 is connected to the right front axle at 17. The cylinder 71 includes an upper port 74, and lower port 75, and a position-sensing port 76 located between the ports 74 and 75. In the left front of the vehicle is provided a cylinder and piston assembly 80 having a cylinder 78, a piston assembly 79, and a piston shaft 81. The cylinder 78 is connected to the left front axle at 18, while the piston shaft 81 is anchored to the left front of the vehicle body at 26b. The cylinder 78 has upper port 83, lower port 85 and position-sensing port 86.

The right front cylinder and piston assembly 70 is connected at its upper port 74 to the hydraulic line 50, at its lower port 75 to the hydraulic line 62, and at its position-sensing port 76 to a hydraulic line 55, which is connected to the return R line of the hydraulic pump 30. Similarly, the cylinder 78 is connected at its upper port 83 to the hydraulic line 60, at its lower port 85 to the hydraulic line 52 and its position-sensing port 86 to the hydraulic line 65, the hydraulic line 65 being connected at 66 in common with the line 55 to the return line 32 port of the hydraulic pump 30.

A pair of rear wheel cylinder and piston assemblies 90 and 100 are disposed at, respectively, the right rear and left rear of the vehicle. The assembly 90 includes a cylinder 91 in which is disposed a piston 93 connected to a piston shaft 92. The piston shaft 92 is anchored at 20 to the right rear axle of the vehicle. The cylinder 91 is connected to the body of the vehicle at 94. The left rear cylinder and piston assembly 100 includes a cylinder 101, a piston 103, and a piston shaft 102. The piston shaft 102 is anchored to the left rear axle at 22, while the cylinder 101 is anchored to the left rear of the vehicle body at 104.

The cylinder and piston assembly 90 has a lower hydraulic port 97 connected to the hydraulic line 51, and a lower hydraulic port 97. The left cylinder and piston assembly 100 has a lower hydraulic port 107 connected to the hydraulic line 61, and an upper hydraulic port 105 connected through hydraulic circuit 109 to the upper port 95 of the assembly 90.

Figure 2:
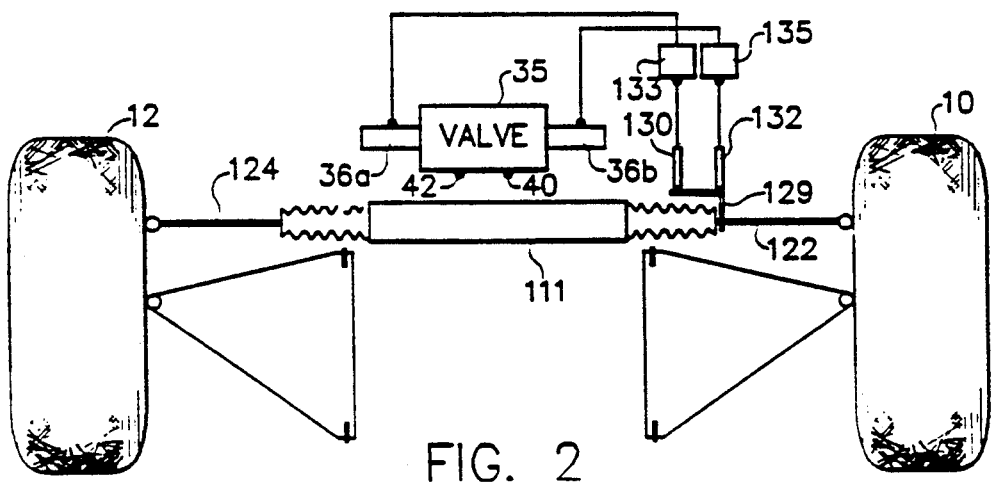
FIG. 2 is a schematic diagram illustrating control of the solenoid valve of FIG. 1.

Reference to FIG. 2 will provide an understanding of how the solenoid-driven valve 35 operates. The solenoid valve 35 is anchored to the vehicle body and generates a hydraulic signal for tilt correction in response to operation of the steering mechanism of the automobile in which the system of FIG. 1 is mounted. In this regard, the steering mechanism is conventional and includes a steering rack 121 which is stationarily attached to the vehicle. Steering is provided by the tie rods 122 and 124, each connected to a respective front wheel. For a right turn, the tie rod 122 is extended, while the rod 124 is retracted, causing the wheels 10, 12 to pivot toward the right. Correspondingly, for a left turn, the tie rod 124 extends, the tie rod 122 retracts, causing the wheels 10, 12 to pivot to the left. A control plate 129 is attached to the tie rod 122 to move with it and to provide an indication of turn direction. A preferred alternative is to locate the control plate on the steering column, which provides immediate indication of turn direction. A pair of proximity sensors are stationarily mounted to the vehicle body, adjacent the plate 129, to sense its position and to provide sense signals to a pair of relays 133 and 135, respectively. The relays 133 and 135 are connected to the solenoid coils 36a and 36b, respectively, of the solenoid valve 35.

When the vehicle is traveling in a straight line, the proximity sensor 129 will be adjacent both of the sensors 130 and 132, deactivating both of the relays 133 and 135. In this case, the solenoid coils are inactive and the valve spool is in a neutral position which blocks provision of the P and R potentials to the ports 40 and 42. A right-hand turn will move the plate 129 away from the sensor 130, activating the relay 133, and through it, the solenoid coil 36a. This will configure the solenoid valve 35 to provide the pressurizing signal potential through the port 42 and the return potential of the hydraulic signal through the port 40. Conversely, during a left-hand turn, the plate 129 moves away from the sensor 132, activating the relay 135, and through it, the coil 36b. This provides the pressurizing potential of the hydraulic signal through the port 40 and the return potential through the port 42.

Returning to FIG. 1, it is asserted that, as the vehicle executes a left-hand turn, the centrifugal forces generated tend to roll the vehicle body clockwise on its longitudinal axis, raising the inside (left) edge, and lowering the outside (right) edge of the body. As a result, the right-hand cylinder and piston assemblies 70 and 90 are compressed, while the left-hand assemblies are expanded. This means that, on the right-hand side, the pistons 72 and 93 move downwardly and upwardly, respectively, in their cylinders. Correction requires reversing these directions. On the left-hand side of the vehicle, the pistons 79 and 103 move up and down, respectively, in their cylinders; correction requires reversal of these movements. The anti-roll correction provided by this invention will configure the hydraulic signal discussed above in such a manner as to provide hydraulic signal components to the assemblies 70 and 90 to counteract their compression, while providing hydraulic components to the assemblies 80 and 100 to counteract their expansion.

When the turn direction sensors 130 and 132 indicate that vehicle in which the system of FIG. 1 is mounted makes a left-hand turn, the relays 133 and 135 configure the value 35 such that the pressurizing potential is provided at the port 42 and the return potential at the port 40 of the valve 35. With the left-hand turn, the right-hand side of the vehicle rotates toward the ground, compressing the assemblies 70 and 90. The pressurizing potential of the hydraulic signal is provided, in the right-hand side of the vehicle, to the bottom port 75 of the assembly 70. At the same time, the return potential of the hydraulic signal is provided to the upper port 74 and lower port 97 of the right-hand cylinder and piston assemblies 70 and 90, respectively. Considering the right front assembly 70, the return potential at the upper port 74 permits the piston 72 to move upwardly in the cylinder 71. This potential is complemented by the pressurizing potential provided through the port 75, which pushes the piston 72 upwardly. Similarly, in the right rear cylinder and piston assembly, the return potential is conducted through the signal line 51 in the assembly 90 through the port 97, which permits the piston 93 to be pushed downwardly in the cylinder 91.

Continuing with the description of the right-hand turn correction, on the left-hand side of the vehicle, the pressurizing potential is conducted to the top of the piston 79 in the assembly 80, and to the bottom of the piston 103 in the assembly 100. The return potential is conducted to the bottom of the cylinder 79 in the assembly 80. With the piston 79 receiving the pressurizing potential on its top surface and the return potential on its bottom face, the piston will be moved downwardly in the cylinder 78, thereby compressing the assembly 80. Similarly, the pressurizing potential delivered to the bottom of the piston 103 through the port 107 will move the piston 103 upwardly in the cylinder 101, thereby compressing the assembly 100.

Completing the description of the circuit of FIG. 1, during the left-hand turn, upward movement of the piston 103 will displace hydraulic fluid from the upper portion of the cylinder 101 into the upper portion of the cylinder 91 by the path 105, 109, 95. This will transfer the pressurizing potential to the upper surface of piston 93, thereby complementing the downward motion of the piston resulting from introduction of the return potential through the port 97.

For an understanding of the tilt limitation feature, recall that the return potential is provided to the position-sensing ports 76 and 86. The return potential will be introduced only when the respective piston has undergone a sufficient downward displacement. Upward displacement of the piston of a front wheel cylinder and piston assembly will not uncover the assembly's position sensor port.

Therefore, continuing with the left-hand turn explanation, the left-hand turn will tend to compress the right-hand cylinder and piston assemblies, resulting in a relative downward movement of the piston 72 within the cylinder 71 and an upward movement of piston 79 in cylinder 78. However, at the time that the left-hand turn is initiated, the corrective action of the anti-roll system described heretofore exerts a compressing correction on the left-hand assemblies 80 and 100. The compressing correction moves the piston 79 downwardly in the cylinder 78. When the piston 79 has undergone a sufficient downward displacement, the return potential is introduced into the upper portion of the cylinder 78 through the position sensing port 86. This "short-circuits" the return and pressurizing potentials of the hydraulic signal in the cylinders 78, 91, and 101 thereby preventing any further roll correction in either the left- or right-hand cylinder and piston assemblies. This effectively limits the amount of tilt which the system introduces to correct the roll experienced in the left-hand turn.

In operation, correction is introduced into the system any time the valve 35 is actuated in response to a change of steering angle from a neutral position. Thus, correction "leads" or "anticipates" slightly the roll of the vehicle. As the turn begins in response to steering, the roll force comes into effect. The roll and correction forces are kept in balance by the position sensing ports whose actions tend to keep the vehicle body level in a turn.

The skilled artisan will appreciate that the just-given explanation for left-hand turn correction, when reversed, will counteract the roll introduced by a right-hand turn.

After a turn has been completed, the steering assembly is returned to its neutral or straight-ahead configuration, thereby closing the solenoid valve 35, removing the return and pressurizing potentials of the hydraulic signal from the ports 40 and 42. This results in a return of the cylinder and piston assembiies 70, 80, 90 and 100, to their neutral positions. In the neutral positions, the pistons 72 and 79 are positioned in their respective cylinders at locations which cover the position-sensing ports of the cylinders.

FIG. 3 illustrates construction details of the rear wheel cylinder piston assemblies which will provide an understanding of how they operate to provide shock absorption, while also providing anti-roll correction. The rear wheel cylinder and piston assembly 100 is illustrated with the understanding that the illustration and the following explanation apply also to the assembly 90. The assembly 100 includes the cylinder 101 in which the piston 103 moves longitudinally. The piston 103 includes a piston body 200 with two through ports 201 and 202 which open completely through the body 200 between its upper and lower faces. Two valve springs 207 and 210 are provided on the lower and upper faces, respectively, of the piston body 200. The spring 207 covers and closes the lower end of the port 201, while the spring 210 covers and closes the upper end of the port 202. The spring 207 has an orifice 208 which communicates with the port 202, while the spring 210 has an orifice 211 which communicates with the port 201. Shock absorption is provided when the piston shaft 102 is displaced either up or down as the rear wheel to whose axle it is attached encounters a bump or a pothole. Assuming a bump, the shaft 102 transfers an upwardly-directed shock displacement to the piston 103. If the piston were solid, the incompressibility of the hydraulic fluid with which the cylinder 101 is filled would prevent the piston moving, assuming no complementary displacement of the piston in the opposite rear wheel cylinder and piston assembly. However, the upward force exerted on the piston 103 causes a relative displacement of hydraulic fluid downward through the through port 201 against the valve spring 207. Although the spring 207 closes the lower opening of the port 201, the spring will give way from the opening in response to the relatively downwardly-moving column of hydraulic fluid, thereby permitting the fluid to flow through the port 201. This permits the piston 103 to move upwardly in the cylinder 101. Similarly, downward motion of the piston in response to a sharp movement of the piston shaft 102 is permitted by movement of hydraulic fluid upwardly through the through port 202 against the spring 210. The inventor, recognizing the need to damp piston movement resulting from jounce (bumps) differently than piston movement resulting from rebound (potholes), has provided a spring constant for the spring 210 which is higher than the spring constant for the spring 207. Relatedly, the spring 210 may be thicker than the spring 207. During cornering, when the fluid is circulated through the ports 107 and 105, the spring 210 provides a compressing force that is greater than the extending force of the assembly 90. This pulls the inside rear corner of the vehicle down, counteracting the natural tendency of the vehicle to pitch diagonally, down at the outside front end and upwardly at the inside rear.

FIG. 4 illustrates construction details of the front wheel cylinder and piston assemblies, which will provide an understanding of how they operate to provide shock absorption, while also providing an anti-roll correction. FIG. 4 illustrates in greater detail the assembly 80, with the understanding that the details of FIG. 4 are also found in the other front wheel cylinder and piston assembly 70. In the cylinder and piston assembly 80, the piston 79 comprises an assembly including a lower piston 300 fixed to the shaft 81 by a nut 302. The lower piston 300 has an disc configuration through which fluid access is provided by ports 300a and 300b. A non-metallic piston ring 303 positions the fixed piston 300 against the inner wall of the cylinder 78. A foam accumulator 305 is concentrically positioned on the shaft 81 above the fixed piston 300. A rubber washer 307 is placed at the bottom of the fixed piston. Disposed above the fixed piston 300 is a "floating" piston 309, which has an upside-down, open cup-like configuration. A metallic piston ring 311 seals the outer surface of the floating piston 309 against the inner surface of the cylinder 78. An upper rubber washer 312 provides a fluid-resistant seal between the shaft 81 and the central bore of the floating piston 309 through which the shaft 81 extends. A lower rubber washer 313 also provides a fluid-resistant seal between the shaft 81, and the central bore of the floating piston. A rigid annular retainer in the form of a metal disc 318 is attached to the shaft 81 to provide an upper stop for a rubber spring 315. The disc has a radius which is less than the radius of the cylinder 78. A flexible annular washer in the form of a rubber disc 319 is held concentrically on the shaft 81 above the disc 318. The washer 319 has a radius which is less than the radius of the cylinder 78, but greater than that of disc 318. The washer is preferably held against the disc by a retaining ring (not shown). An annular foam accumulator 321 is positioned concentrically on the piston shaft in the cylinder 78 between the upper end of the cylinder and the washer 319.

The rubber washer 312 extends radially to contact the interior surface of the cylinder 78; the washer 313 extends radially to contact the inner surface of the floating piston 309; therefore, the hydraulic fluid 325 can flow between the inner surface of the cylinder 78 and the perimeters of these washers. The inner bore 310 of the floating piston 309 has a larger diameter than the shaft 81. This allows the inside edges of the washers 312 and 313 to curl and permit fluid to pass momentarily. The piston 309 will follow, due to the curling resistance of the washers, and reseat.

The neutral position of the piston shaft 81 with respect to the cylinder 78 positions fixed and floating pistons 300 and 309 as illustrated in FIG. 4. In this regard, the floating piston 309 is positioned so that its upper edge is just above the position-sensing port 86. This seals the port, preventing the introduction of the return potential into the cylinder 78. Assume now that a left-hand turn is begun, in which case, the cylinder and piston assembly 80 will expand, moving the piston assembly 79 upwardly in the cylinder 78. Immediately, the solenoid valve 35 is configured to provide the pressurizing potential through the upper port 83 and the return component through the lower port 85, to counteract the upward displacement of the piston assembly 79. Now, the pressurizing potential presses downwardly on the floating piston 309. The net effect is to produce a downward correcting motion on the floating piston 309. This moves the entire piston assembly 79 downwardly until the combination of compression of the washer 307 and downward movement of the fixed piston 300 displaces floating piston 309 downwardly by an amount sufficient to uncover the position sensing port 86. At this point, the pressurizing potential component will be "short circuited" through the port 86, preventing any further downward movement of the piston assembly 79. When these correcting forces are removed, the mechanical suspension of the automobile will move the piston assembly 79 back to the unactivated, neutral position illustrated in FIG. 4.

Next, when the correction potentials are reversed so that the port 85 is pressurized and the return potential is provided in the port 83, the net pressure acting on the fixed piston 300 will move it upwardly, and with it the floating piston 309. As inspection of FIG. 4 will confirm, the floating piston 309 must be displaced upwardly a significant distance before the port 86 is uncovered. However, before the floating piston can be displaced by this distance, the floating piston in the right front cylinder and piston assembly will have been displaced downwardly, thereby shorting the return to the pressurizing potential through the upper portion of the cylinder 71.

Assume now that the left front wheel encounters a bump, resulting in a sudden displacement of hydraulic fluid upwardly through the port 300a and 300b of the fixed piston 300. The amount of flow is determined by the ratio of the total area of the ports 300a and 300b to the total surface area of the upper face of the fixed piston 300 and ports 83, 85 and flow into the upper portion of the cylinder. Displacement of hydraulic fluid upwardly is transferred against the lower face of the floating piston 309, resulting in a upward displacement of the floating piston against the force of the spring 315. Upward displacement of the floating piston 309 causes the outward edge of the washer 319 to curl upwardly, which permits hydraulic fluid 325 to be displaced upwardly into the top of the cylinder 78. Displacement in this direction is absorbed by compression of the foam 321. After upward displacement by the bump, the cylinder and piston assembly 80 is returned to its neutral configuration of FIG. 4 by the mechanical suspension components, including the external springs 39a and b illustrated in FIG. 1, which act between the body of the vehicle and the cylinder 78.

Next assume that the left front wheel 12 encounters a pothole. In this case, the cylinder 78 is pulled downwardly with respect to the piston assembly 79. Now, the hydraulic fluid in the lower portion of the cylinder 78 is increased by flow through port 85 and moves downwardly, from the interior of the piston 300 as aided by expansion of the foam 305. Simultaneously, hydraulic fluid is forced downwardly from the top of the cylinder 78; the downward displacement being accompanied by compression of the foam 321. However, the displacement of fluid downwardly past the washer 319 is relatively slower than upward displacement past the washer 319 because downward curvature of the washer is limited by the disc 318. The downward displacement of the hydraulic fluid acts against the floating piston 309 to keep it forced against the rubber washer 307. Again, when the pothole is passed, the external mechanical suspension components of the vehicle return the cylinder and piston assembly of FIG. 4 to their neutral positions.

Sudden surges of hydraulic fluid in the system of FIG. 1 are dampened by the damping mechanism of FIG. 5. The damping mechanism of FIG. 5 consists of a cylinder 400 with a stationary annular disk 405 with through ports 407 and 409. A pair of valve springs 410 and 412 are disposed on respective opposing faces of the annular disk 405. Spring 140 has an opening 411 which communicates with the port 407; the spring 412 has an opening 413 which communicates with the through port 409. The spring constant of the springs 410 and 412 are substantially equal. The damping mechanism of 400 operates in much the same manner as the shock absorbing element of the pistons in the front and rear wheel assemblies 90 and 100 with the exception that the annular disk 405 does not move. In this regard, a sudden surge of hydraulic fluid into the port 420 will be communicated through the port 407 against the spring 412. If the surge is of sufficient magnitude, the spring 412 will be slightly displaced to permit displacement of fluid from the left to the right-hand side of the cylinder 400. Similarly, a surge of hydraulic fluid entering the cylinder 400 through the port 422 will be dampened by the spring 410.

Figure 6:
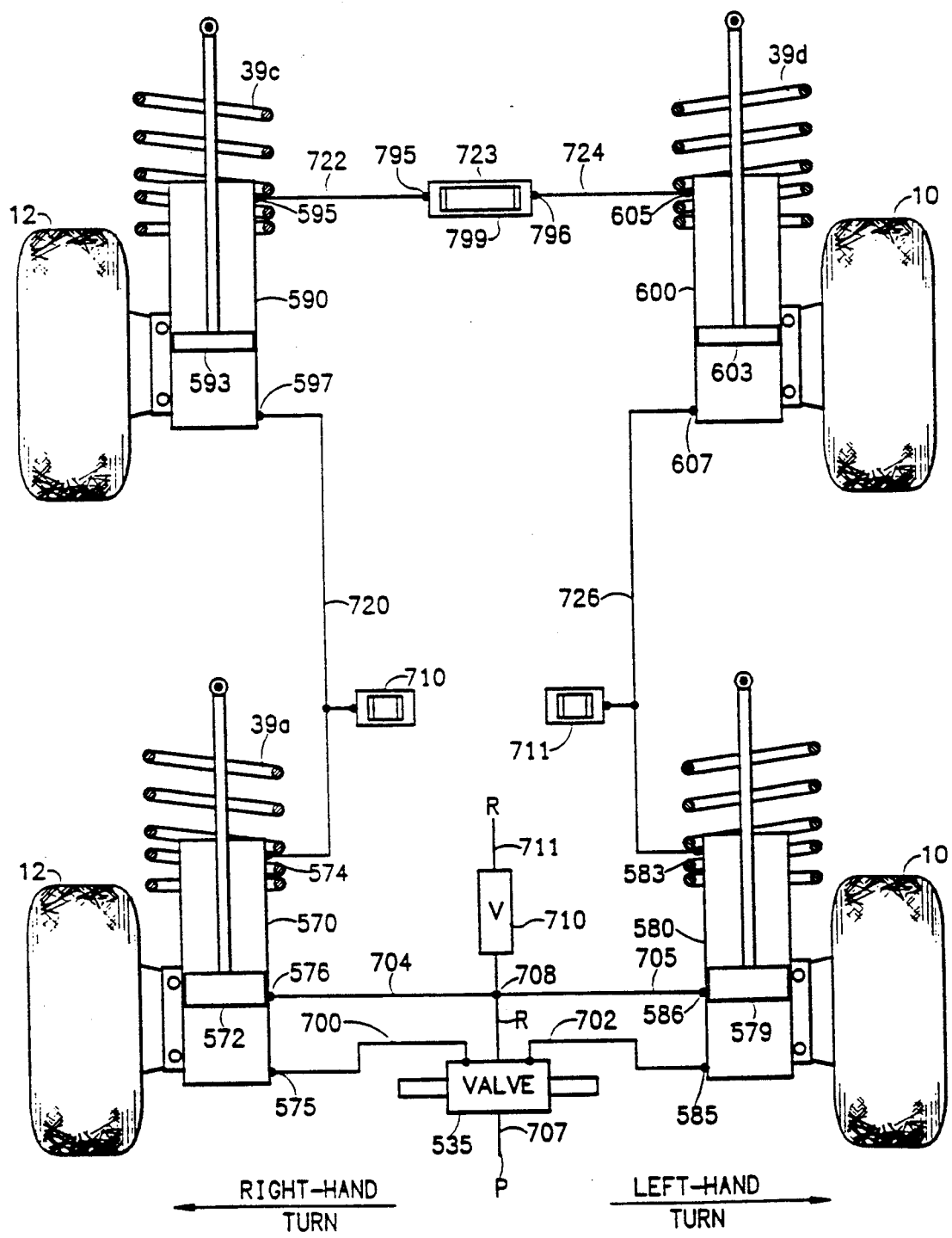
FIG. 6 illustrates a second embodiment of the invention.

Refer now to FIGS. 6-9 for an understanding of the second embodiment of the invention in which numerals which are identical with the numerals in FIG. 1 indicate like parts. Thus, the schematically-represented system of FIG. 6 is understood to be used in conjunction with a vehicle including a body, a frame, wheels, a suspension which connects the body to the wheels, and means for rotatably connecting the wheels 10, 12, 14, and 16 to the frame. The suspension is represented in part by springs 39a–39b. In FIG. 6, there are a plurality of hydraulicly-actuated cylinder and piston assemblies which include the assemblies 570, 580, 590, and 600. The assemblies 570 and 580 are front wheel assemblies which are connected to the vehicle between the vehicle body and the front wheels 10 and 12, respectively. The assemblies 590 and 600 are rear wheel assemblies which are connected between the vehicle body and the rear wheels, 14 and 16, respectively. The cylinder and piston assemblies are hydraulicly actuated to be alternately compressed or expanded in response to the flow of hydraulic fluid.

The front wheel assembly 570 includes a cylinder in which is slidably disposed a piston 572. The cylinder has upper and lower ports 574 and 575 and a position-sensing port 576 which is normally closed to the upper and lower ports by the rest position of the piston 572. Identically, the cylinder and piston assembly 580 includes a cylinder with a piston 579, upper and lower ports 583 and 585, respectively, and a position-sensing port 586 normally closed by the piston 579.

The rear cylinder and piston assembly 590 includes a cylinder with a slidable piston 593 and upper and lower ports 595 and 597, respectively. Identically, the rear wheel assembly 600 has a cylinder with a slidable piston 603, an upper port 605, and a lower port 607.

A differential hydraulic signal is provided from a pumped source (not shown) by way of a valve 535 which is identical in structure and operation with the valve 35 of FIG. 1. Further, the valve 535 is operated by a control means (not shown) identical in all respects with that illustrated in FIG. 2. Thus, the valve operates in response to a vehicle turn by outputting a differential hydraulic signal including pressure (P) and return (R) potentials which indicate the direction of the vehicle turn as discussed above with reference to the valve 35 of FIG. 1. One output of the valve 535 is connected to the lower port 575 of the assembly 570 by a hydraulic connection 700. Hydraulic connection 702 connects the other output of the valve 535 to the lower port 585 of the assembly 580. The position-sensing ports 576 and 586 are connected by hydraulic lines 704 and 705 to a common point 708 which is connected through a back pressure valve 710 to the return potential R of the hydraulic pump (not shown).

On a first (right) side of the vehicle, the cylinder and piston assembly pairs 570 and 590 are interconnected through upper port 574 and lower port 597 by a hydraulic line 720, accumulator 710, identical in construction to accumulator 723. The upper ports 595 and 605 of the rear wheel cylinder and piston assemblies are interconnected by hydraulic line 722, accumulator 723, and hydraulic line 724. The circuit is completed by hydraulic line 726, and accumulator 711, which connects the ports 607 and 583 of the pair of cylinder and piston assemblies 600 and 580, respectively, on the second (left) side of the vehicle. As shown in FIG. 6, the accumulators 710 and 711 are disposed closely adjacent the rear cylinders 590 and 600.

Assume now that the vehicle with the anti-roll system illustrated in FIG. 6 makes a left-hand turn, in which case the right-hand side of the vehicle will incline downwardly with respect to the left-hand side of the vehicle. This is referred to as "roll". Additionally, the front end of the vehicle will incline downwardly with respect to the rear, which is referred to as "pitch". In this case, the rolling force on the vehicle is counteracted by expansion of the cylinder and piston assemblies 570 and 590 and by compression of the cylinder and piston assemblies 580 and 600. The valve 535 will be configured to deliver the pressurizing potential of the hydraulic signal through the hydraulic line 700 to the lower port 575 of the assembly 570, while the return potential is provided to the lower port 585 of the assembly 580 through the hydraulic line 702.

Considering now the components on the right-hand side of the automobile, the pressurizing potential introduced through the port 575 will move the piston 572 upwardly, forcing fluid out of the upper port 574 through the conductor 720 and into the bottom port 597 of the rear assembly 590. This will move the piston 593 upwardly. Upward movement of the pistons 572 and 593 will provide an erecting force on the right-hand side of the vehicle to counteract the downward inclination induced by the rolling force of the left-hand turn.

To complement the expansion of the assemblies 570 and 590, the assemblies 580 and 600 on the left-hand side of the vehicle will be compressed by the return potential delivered to the lower port 585. Under the influence of the return potential, the piston 579 will move downwardly drawing hydraulic fluid into the assembly via 583, 726, 607. Extraction of the fluid from the bottom of the assembly 600 will cause the piston 603 to move downwardly. The downward movement of the pistons 579 and 603 will compress the assemblies 580 and 600, thereby counteracting the upward inclination of the left-hand side of the vehicle during a left-hand turn. The connection 722, 723, 724 between the upper ports 595 and 605 of the rear assemblies 590 and 600 permits the exchange of fluid between those assemblies. During the left-hand turn just described, the hydraulic fluid will flow from the assembly 590 to the assembly 600.

In response to a right-hand turn, the valve 535 will be configured to provide the pressurizing potential of the hydraulic fluid signal to the lower port 585 and the return potential to the lower port 575. In this case, the actions of the cylinder and piston assemblies will be the reverse of that just described.

Figure 7A:
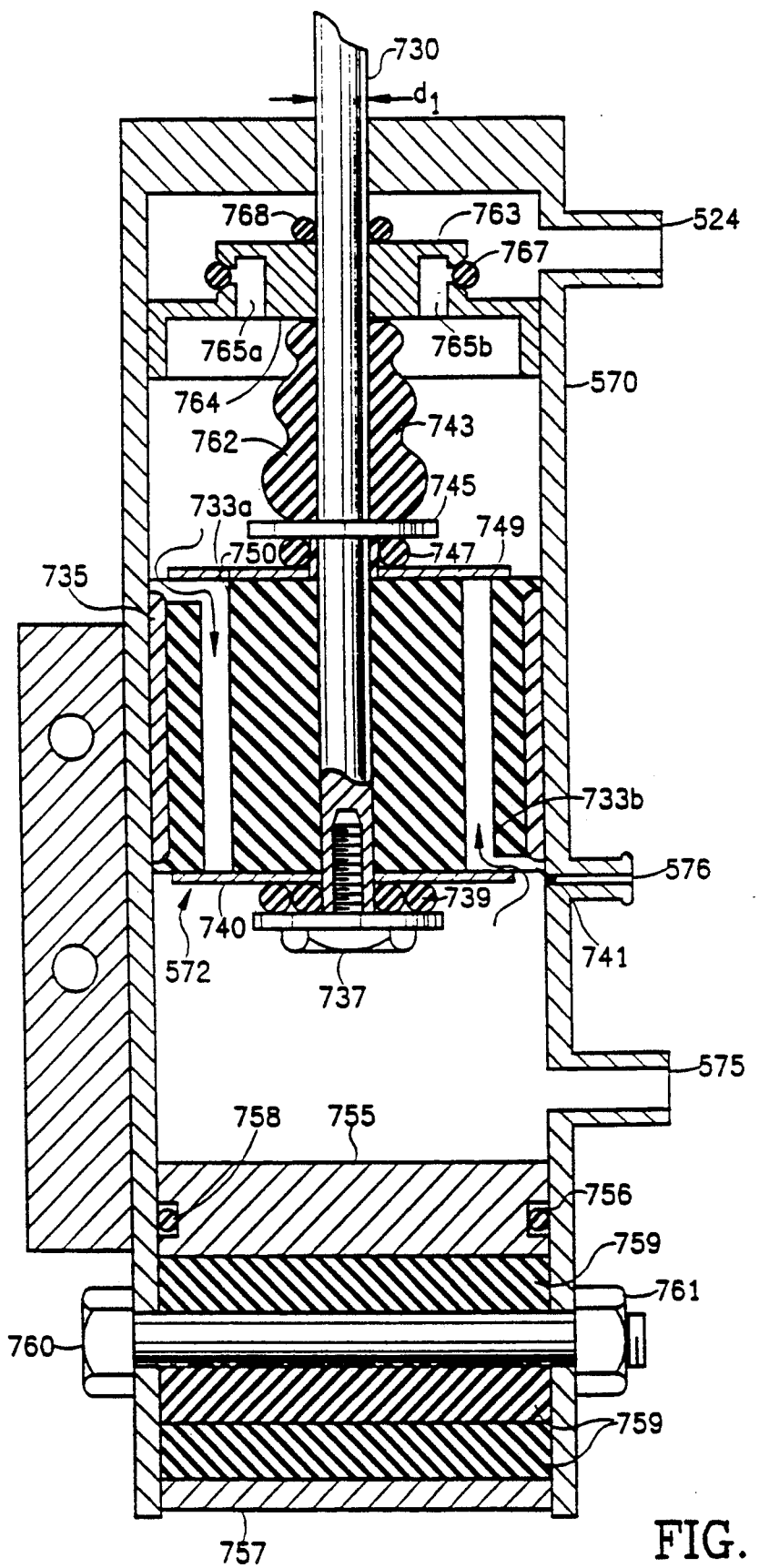
FIG. 7A is a side cutaway view illustrating a front wheel cylinder and piston assembly used in the embodiment of FIG. 6.

Refer now to FIGS. 7A and 7B for an understanding of the structure and operation of the front wheel cylinder and piston assemblies 570 and 580. FIG. 7A illustrates only the assembly 570, with the understanding that the assembly 580 is identical in all respects.

As the cross-section drawing of FIG. 7A illustrates, the front wheel cylinder and piston assembly 570 includes a piston 572 which is slidable within the cylinder. The piston 570 is connected by a piston rod 730 to the body of the automobile by conventional means. The piston includes a piston body 732 with radially-spaced, axially-extending bores 733a, 733b. Although only two bores are shown in the Figure, it is understood that more may be provided in cross-sectional planes not shown. One end of each bore is flared radially to provide a fluid passage around the end of a disk. The bore 733a is flared at the top of the piston so that fluid can flow from the upper portion of the cylinder, around the edge of the disk 749, into the bore. The bore 733b is similarly flared at the bottom of the piston to provide a fluid passage around the edge of the disk 749. An annular teflon piston ring 735 encircles an indented outer surface of the piston 572. The piston 572 is attached to the rod 730 by an arrangement which includes a threaded nut 737, a washer 738, and two O-rings 739a and 739b, and the disk 740. The top of the piston is retained on the rod by an arrangement including a retaining ring 743, a washer 745, an O-ring 747 and a disk 749. The disks 740 and 749 can comprise conventional valve springs which operate as described above with regard to the valve springs 207 and 210 illustrated in FIG. 3. The O-rings 739a and b and 747 act essentially as springs and compress in response to movement of the plates 740 and 749, respectively.

A lower floating piston 753 seals the bottom of the cylinder 570. The lower floating piston is generally cylindrical with an upper portion 755 in which is cut an annular slot 756. An O-ring 758 in the slot 756 provide a fluid seal which retains the hydraulic fluid in the cylinder 570. As shown in FIG. 7B, the bottom portion of the floating piston 753 has a rectangular slot which is completely occupied by three rubber cylinders made of O-ring material (759a, 759b, and 759c). Two of the rubber cylinders are beneath the bolt, while one is positioned above it. Holes are cut diametrically at the bottom of the cylinder 570 so that the floating piston 753 can be retained at the bottom of the cylinder by the elongate bolt 760 and nut 761.

Figure 7C:
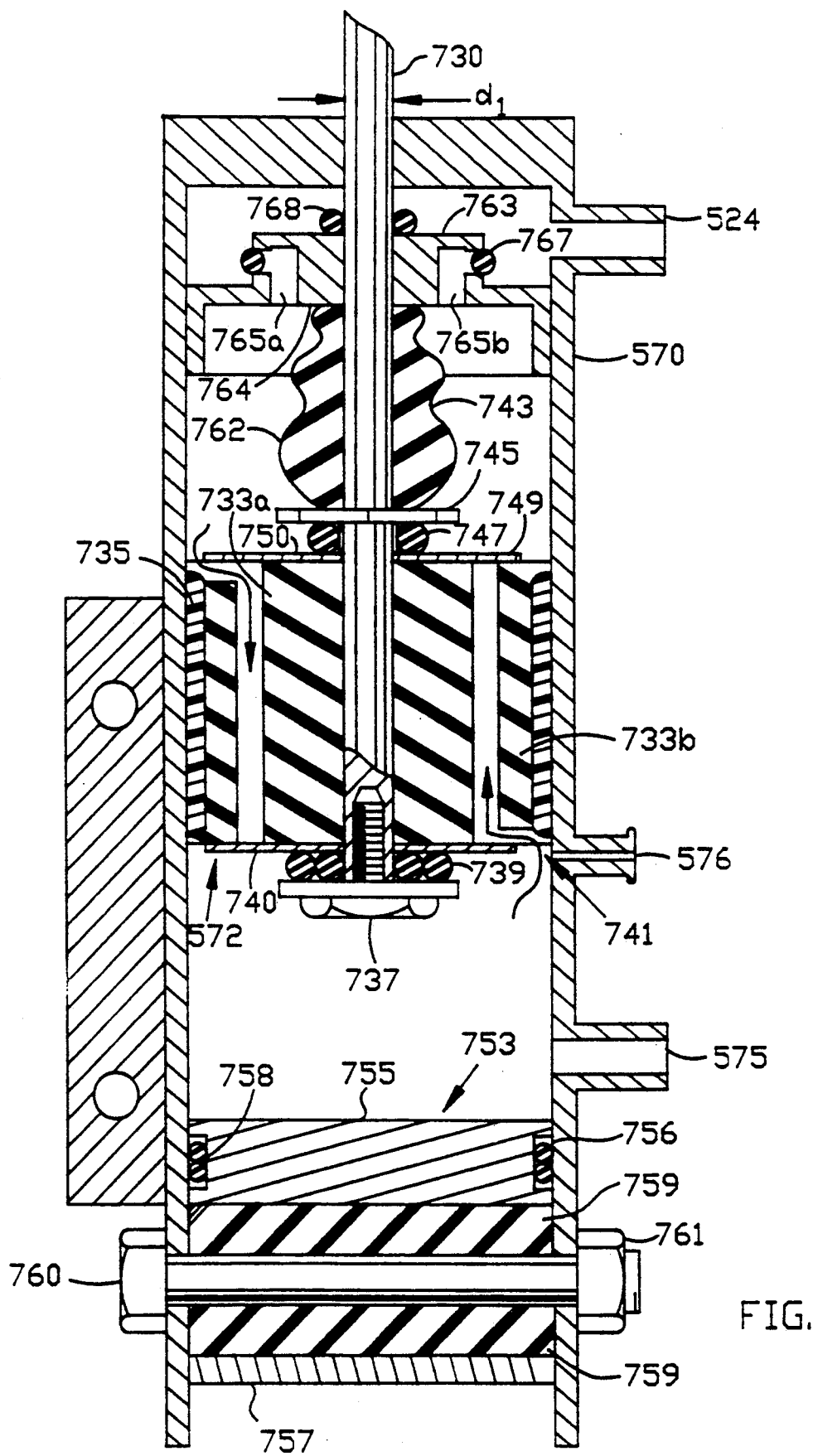
FIG. 7C is a side cutaway view illustrating an alternative construction of the wheel cylinder and piston assembly used in the embodiment of FIG. 7.

As further shown in FIG. 7C, the floating piston 753 may be modified such that the slot 756 is vertically elongated in order to positionally retain a pair of O-rings 758. In this configuration the possibility of fluid cavitation in the cylinder 570 is minimized. Such cavitation might otherwise occur when a rapid upward movement of the piston 572 causes a momentary pressure drop across the floating piston 753 and allows air to be drawn into the cylinder 570 around the periphery of the floating piston 753. There is thus provided an enhanced fluid seal at the interface of the floating piston 753 and the cylinder 570. In addition, further modification may be realized by eliminating the lower rubber cylinder 759c such that there is only a single rubber cylinder 759a above the bolt 760 and a single rubber cylinder 759b below.

Positioned above the piston 572 is an upper floating piston assembly including a rubber spring 762 having a through bore through which the piston rod 730 extends. Above the rubber spring 762 an annular cup-shaped floating piston 763 having a cylindrical cut-out center portion with a bottom surface 764 which contacts the upper end of the rubber spring 762. A pair of 90-degree through-ports 765a and 765b are cut through the surface 764 from which they extend upwardly until making 90-degree turns. The upper ends of the through ports 765a and 765b are sealed by an O-ring 767 seated in an annular groove in the upper portion of the floating piston 763. The cup-shaped floating piston 763 has an axial bore through which the piston rod 730 extends and the piston is free to move on the rod. A stopping O-ring 768 is placed on the rod 730 between the upper inner surface of the cylinder 570 and the upper surface of the floating piston 763. The largest diameter of the floating piston 763 is less than the inner diameter of the cylinder 570, affording a fluid path between the inner surface of the cylinder 570 and the piston's extreme outer surface. Fluid is able to travel in either direction on this path. Uni-directional fluid paths are afforded upwardly through the through-bore 765a and 765b. When fluid pressure is transferred in this direction, the O-ring 767 will give outwardly slightly to open these passages. However, fluid flowing against the O-ring 767 from within the upper portion of the cylinder will only seat the ring more tightly against the bores 765a and 765b, preventing fluid flow downwardly through these passages.

When an automobile to which the cylinder and piston assembly 570 has been mounted is normally loaded and at rest, the lower end of the piston 572 occupies a position between the position sensing port 576 and the lower port 575. When a pressurizing potential is introduced through the bottom port 575 to expand the cylinder and piston assembly 570, the piston 572 moves upwardly in response to the pressurizing potential until the position-sensing port 576 is uncovered. When this occurs, the pressurizing potential is returned through the port 576, thereby preventing any further roll correction. When the pressurizing signal is removed, the cylinder 572 returns to its rest position where its lower end is positioned between the ports 575 and 576.

Tilt limitation as practiced in the second embodiment of the anti-roll system, which is illustrated in FIG. 7, is enabled in response to expansion of the front wheel cylinder and piston assemblies. This contrasts with the operation of the front wheel cylinder and piston assemblies in the first embodiment. As explained above and as reference to FIG. 4 shows, tilt limitation in the first embodiment is activated in response to compression of the front wheel cylinder and piston assemblies. In practice, the requirements and circumstances of an application will determine which of these embodiments is the best mode of practicing the invention. The inventor has found that, all things being equal, the cylinder and piston assembly used in the second embodiment provides a certain advantage. In many applications, when a vehicle is loaded with passengers or freight, a portion of the added load is applied to the cylinder and piston assemblies of the anti-roll system. In the first embodiment, this results in compression of the front wheel cylinder and piston assemblies which moves the top surface of the piston toward the position sensing port. This reduces the amount of roll correction that the first embodiment can introduce until tilt limitation occurs. In contrast, compression of the cylinder and piston assembly illustrated in FIG. 7 will move the lower surface of the piston 272 downwardly, thereby increasing the amount of roll compensation which the second embodiment will provide before tilt limitation occurs.

The combination of the disks 740 and 749 with the through-bores in the piston 572 provides shock absorption substantially as described above with reference to FIG. 3. The difference is that shock displacement of the piston causes fluid to flow around the edge of a disk, through the flared end of a through bore and against the disk at the other end of the through bore. Use of the O-rings 739 and 747 to transfer retaining force to the disks 740 and 749 affords a low-cost, reliable spring action which opposes movement of the disks in response to fluid displacement in the cylinder and piston assembly 570. Thus, for example, assuming that the front wheel where the assembly 570 is mounted hits a bump, the assembly 570 will undergo a short, sharp compression which is accommodated by movement of hydraulic fluid around the disk edge through the bore in the cylinder 733b against the disk 749. The disk 749 will transfer the shock force in response to which the O-ring 747 will compress. When the O-ring compresses, the disk moves away from the hole, permitting fluid to flow through it. As the shock impulse dies, the compression of the O-ring will assist in returning this disk 749 to a position covering the bore 733b. The two O-rings 739a and b provide stiffer resistance against rebound than does the single O-ring 747 against jounce.

The upper floating piston assembly also affects shock absorption in the front wheel cylinder and piston assemblies. In this regard, if the front wheel to which the assembly in FIG. 7A is attached encounters a pot-hole, the assembly of FIG. 7A is expanded sharply. The sharp expansion is accommodated by hydraulic fluid flow downwardly through the through bore 733a of the piston 572. Upward movement of the piston 572 also moves the upper floating piston assembly upwardly until the O-ring 768 encounters the upper interior surface of the cylinder 570. When this occurs, the upward movement of the piston 572 is damped and reduced by the compression of the rubber spring 762 against the surface 764 of the upper floating piston 763.

The lower floating piston 753 confers an unexpected result in operation of the anti-roll system. Refer now to FIGS. 7A and 7B. When the upper end of the rod 730 is attached to the vehicle body with a solid bushing and low profile tires are mounted to the vehicle frame, the surface of the road on which the vehicle travels is "transferred" to the cylinder and piston assemblies of the anti-roll system. Relatedly, as bumps and holes are encountered, sudden upward and downward displacement of the wheels tends to cause related compression and expansion of the cylinder and piston assemblies. The road envelope is absorbed to some extent in conventional shock absorbing pistons by using a rubber bushing in mounting the piston to the vehicle body. In this case, the bushing absorbs some of the impulse displacement transferred to the cylinder and piston assembly from the road surface. A solid bushing will not provide this absorption. However, in the assembly of FIG. 7A, the impulse response to bumps and potholes in the road surface is partially absorbed by the lower floating piston. As the piston 572 responds to the random impulses in the surface of the road by the shock absorbing action described above, the surges which this action produces in the hydraulic fluid are absorbed by upward and downward translation of the lower floating piston 755 on the rubber cylinders 759 about the center line of the stationary bolt 760. The inventor has found that this floating piston configuration significantly suppresses the audible response of the cylinder and piston assemblies of an anti-roll system to road surface effects. Further, with two rubber cylinders beneath the bolt, and one above it, the floating piston yields more in response to rebound than to jounce.

The rear wheel cylinder and piston assemblies are equivalent and the assembly 590 is illustrated in, and explained with reference to, FIG. 8. The assembly 590 includes a moveable piston 593 which slides reciprocally within the cylinder in response to movement of hydraulic fluid through the ports 595 and 597. Sustained, low frequency fluid transfer through these ports results from provision of the differential fluid signal provided through the valve 535. This response has already been explained. The rear wheel cylinder and piston assemblies also provide shock absorption in these fixed pistons with an arrangement virtually identical with that employed in the front wheel cylinder and piston assemblies. Such shock absorption is provided through the piston 593 which is mounted to the piston rod 770 between a threaded nut 771 and a retaining ring 776. Nut 771 thrusts against a washer 773 and an O-ring 775 which holds an annular disk. Similarly, at the top of the piston, retaining washer 777 transfers retaining force through an O-ring 778 to a valve spring with holes which match selected bores through the piston 593. This arrangement provides shock absorption response for the assembly 590 as explained above for the front wheel assemblies.

The assembly 590 also includes an upper floating piston assembly 780 which operates identically to the upper floating pistons of the front wheel assemblies. The upper floating piston assembly includes a rubber spring 781, a cup-shaped floating piston 782 with a sealing O-ring 783 and a stopping O-ring 784.

The rear assembly 590 also includes a lower cylindrical portion 800 which is in perpendicular fluid communication with the cylinder 590. A lower, cup-shaped floating piston 801 is slidably disposed in the extension 800 and is retained therein by an O-ring 802 and a retaining piston 803 having an annular O-ring 804 which hydraulically seals the extension 800. The piston 803 is retained in the extension 800 by a retaining ring 805.

The lower floating piston 801 is filled with a foam accumulator material 806. A rubber spring 807 is disposed between the interior surface of the cylinder 590 and the back of the lower floating piston 801. The diameter of the lower floating piston 801 is slightly less than the interior diameter of the extension 800, and radial through bores 808 complete a fluid path along the side of the lower floating piston 801 into its interior.

In operation, the lower floating piston assembly assists in shock absorption. In this regard, when a pot-hole is encountered by a rear wheel, the real wheel cylinder and piston assembly of FIG. 8 expands, with the piston 593 moving upwardly with respect to the cylinder. This pulls a vacuum in the lower portion of the cylinder beneath the piston 593 which causes the lower floating piston 801, the O-ring 802, and the sealing piston 803 to move inwardly against the rubber spring 807. When the riding surface again levels, the compression in the rubber spring 807 returns the floating piston, O-ring, and sealing piston against the retaining ring 805. When a bump is encountered, and the piston 593 moves downwardly in the cylinder, hydraulic fluid is displaced downwardly in the cylinder toward the floating piston assembly. This downward movement is dampened when the fluid flows between the outer surface of the floating piston 801 and the extension 800, through the radial through bores 808 against the foam accumulator 806. The accumulator 806 compresses in response to the downward movement of the hydraulic fluid and expands when the bump is passed and the riding surface is once again level.

With this description of the construction and operation of the front and rear cylinder and piston assemblies, consider again the operation of the second embodiment of FIG. 6 in response to a left-hand turn. In left-hand turn, the combined roll and pitch makes the outside front of the automobile tend to dip, while the outside rear of the automobile tends to rise. This tends to compress the right front assembly 570 and expand the rear left assembly 600. In response to the turn, the pressurizing potential is introduced through port 575 of the front assembly 570 while the return potential is connected to the port 585 of the front assembly 580. Refer now to FIGS. 7A and 8. Introduction of the pressurizing potential at port 575 causes a shock-like impulse which increases the pressure at the bottom of the piston 572. The pressure pushes the piston upward in the cylinder, thereby expanding the assembly in reaction to the compression exerted by the turn forces. Some of the shock-like impulse caused by the introduction of the return potential through the port 575 is transferred upwardly through the through port 733b of the piston 572 around the sides and through the through ports of the upper floating piston assembly and out the upper port 524 of the front wheel assembly 570. The pressurizing potential is maintained through the upper port 524 until the position-sensing port 576 is uncovered.

For so long as the pressurizing potential is provided through the upper port 524, the right rear assembly 590 is activated by introduction of the pressurizing potential through the lower port 597. The initial impulse of the pressurizing potential is transferred through the fixed piston 593 and the floating piston out the upper port 595 of the rear assembly. Pressurizing potential is introduced through the upper port 605 of the left rear assembly 600 where it exerts a downward force on the upper floating piston assembly and fixed piston of the left rear assembly. As FIG. 8 shows, the full pressurizing potential introduced through the port 595 is brought against the top of the fixed piston 593 by flow of fluid around the sides of the floating piston and by compression of the rubber spring 781 by downward movement of the floating piston 782. This exerts an immediate compressing action on the left rear assembly which tends to lower the inside rear corner of the automobile during a left-hand turn.

In FIG. 9, the back pressure valve 710 is illustrated. The valve consists of a bored, substantially cylindrical member having hydraulic ports 485 and 487 which connect conventionally to hydraulic conductors. A spring-loaded valve 791 is disposed in an inner chamber 790 of the valve. The valve 791 is loaded by a spring 792 which seats the valve 791 to close the opening 793 when the differential hydraulic signal is absent. When the signal is applied to the system, the pressure keeps the valve opened. Surges of the hydraulic fluid in the anti-roll system of FIG. 7 are damped by displacement of the internal valve 791 against the spring 792. When the surge expires, the spring 792 returns the valve to its partially-open position.

Returning to FIG. 6, hydraulic fluid surges in the anti-roll system of FIG. 6 are also damped by an accumulator 723 (which is shown in cross-section in FIG. 6) connected between the rear cylinder and piston assemblies. The accumulator 723 is a hollow elongate cylinder with hydraulic coupling ports 795 and 796. The ports 795 and 796 are conventionally coupled to the hydraulic line 722 and 724. Disposed in the cylinder is an air-filled bladder 799 made of a flexible material. The hydraulic fluid used in the system is incompressible when compared to the air which fills the bladder 799. Thus, when a surge occurs in the hydraulic fluid in the upper portions of the rear wheel cylinder and piston assemblies, some of the force of the surge is transferred against the outer surface of the bladder 799. Since the air which fills the bladder 799 is relatively compressible, some of the force of the surge will be absorbed by compression of the bladder. When the surge dissipates, the bladder expands to an equilibrium volume forcing fluid back up through the piston. Fluid resistance in the lines connecting the accumulator 723, 710, and 711 are turned to serve in the damping process of medium frequency bumps.

Figure 10:
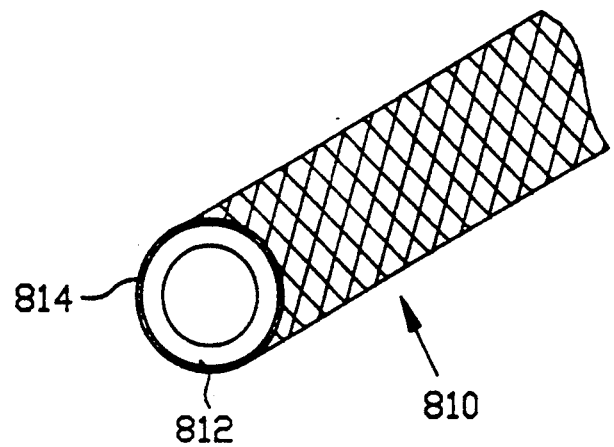
FIG. 10 is a perspective cutaway view of a flexible high pressure hydraulic line useful in the embodiments of FIGS. 1 and 6.
Figure 11:
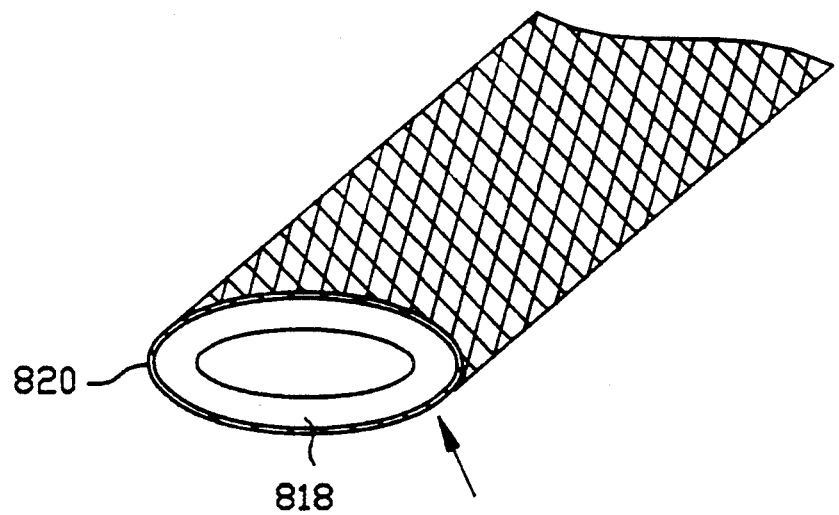
FIG. 11 is a perspective cutaway view of another flexible high pressure hydraulic line useful in the embodiments of FIGS. 1 and 6.

In addition, as shown in FIGS. 10 and 11, further shock absorption may be realized in the system of FIG. 6, as well as the system of FIG. 1, by constructing the hydraulic fluid carrying lines shown in the Figures, and described above, to include a novel radial damping system now to be described. It has been determined that substantial improvement in shock absorbing and damping capability may be derived if the concept of radial shock absorption is employed in conjunction with the axially reciprocal shock absorption systems shown and described above. Radial damping as contemplated herein includes, but is not necessarily limited to, the utilization of a hydraulic spring action provided by a high pressure, expandable fluid carrying line constructed to radially expand under the action of a pressure surge. Such constructions may be realized using fluid carrying line having a high burst strength and an expansion capacity of about two to three times that of standard fabric reinforced line.

A radially expandable fluid carrying line 810 which offers the advantages of radial damping and hydraulic spring action is shown in FIG. 10. The fluid line 810 is formed from an unreinforced flexible hose 812 made from a suitably flexible material. For example, buna-n rubber hose having a durometer rating of about 70 may be advantageously employed. Other suitable materials would include urethane rubber. A fairly thick wall thickness provides increased strength without compromising flexibility. For example, tubing having an inside diameter of about 0.375 inches and an outside diameter of about 0.875 inches may be advantageously employed. The flexible hose 812 is preferably encased in a flexible braided sheath 814 which may be advantageously formed from nylon or the like. The flexible sheath lends increased durability and strength to the flexible line 810 while still permitting necessary radial expansion capability. It will be observed that the line 810 will expand radially in response to increased fluid pressure therein. The degree of that radial expansion will depend on the size and thickness of the line and the materials used in its construction, which may be selected accordingly.

An alternative radial damping construction is shown in FIG. 11. A radially expandable fluid carrying line 816 is made from a flexible thermo-plastic tube 818 covered by a flexible braided sheath 820 made from nylon or the like, which is generally thicker than the sheath 814. In one construction, a tube having an inside diameter of about 0.375 inches and an outside diameter of about 0.750 inches may be advantageously employed. The flexible line 816 is heated and flattened to provide a generally oblong and preferably elliptical cross-section. Thus, the elliptical section may be formed to have a major outside dimension of about 0.750 inches and a minor outside dimension of about 0.4375 inches. This configuration provides a different damping response than that provided by the line 810. The thermo-plastic material of the tube 818 would generally be stiffer than the unreinforced material of the tube 812. In addition, the oblong shape provides a nominally restricted flow path which expands during pressure surges by outward deflection of the sides of the tube 818 situated along the major dimension. Thus, a hydraulic spring action is provided by the bending resistance of the tube wall, in addition to the radial expansion response thereof. Both expandable lines 810 and 816 are designed to operate in a pressure environment of between about 50 to 350 psi. Their use should advantageously provide a fluid damping and shock absorption response to fluid pressure spikes introduced into the suspension system by road surface imperfections and other causes.

In the first and second embodiments of the anti-roll system illustrated and disclosed above, tilt limitation is provided through the position sensing ports of the front wheel cylinder and piston assemblies. In either embodiment, provision of tilt limitation on each side of a vehicle permits a smooth and fast response to vehicle turns. While both embodiments show provision of tilt limitation in the front wheel cylinder and piston assemblies, this is not intended to limit provision of tilt limitation in other cylinder and piston assemblies of an anti-roll system. Further, while, in each embodiment, tilt limitation is activated in response to compression but not expansion, or to expansion but not compression, a need may arise where tilt limitation would be activated in response to compression of one set of assemblies and to expansion of another set of assemblies.

Another feature which produces an unexpected result in this invention can be appreciated with reference to FIGS. 7A and 8. Assuming equal diameters for the cylinders of the assemblies 570 and 590, the inventor has found that providing a piston rod 730 having a larger diameter ($d_1$) than the diameter ($d_2$) of the piston rod 770 will accelerate the response of the front wheel cylinder and piston assemblies to a differential hydraulic signal, compared with the response of the rear wheel assemblies. The larger diameter of the front wheel assembly receiving the pressurizing signal means that a larger surface area will be presented to the portion of the signal which is transferred by the shock absorbing design of the piston. The larger surface area will integrate more of the pressurizing force, thereby "boosting" the expansion of the outside front assembly. This "boost" will counteract the tendency of the inside rear wheel to lift off of the road surface, and suppress any tendency which the vehicle may have to oversteer during a turn.

Finally, all of the hydraulic lines which interconnect the elements of the anti-roll system of this invention can be made of a flexible material, which will increase the damping of the system to surges in the hydraulic fluid.

With this description, it should be evident to those skilled in the art that my invention can be practiced other than as described above, without departing from the spirit of these teachings.

I claim:

1. A system for roll compensation in a vehicle with front and rear wheels, a vehicle body, a body frame with means for rotatably supporting the wheels, and a suspension connecting the wheels and the body, the system comprising:

valved hydraulic signal means for providing a hydraulic signal indicative of vehicle turn direction, the hydraulic signal including a pressurizing hydraulic potential;

a pair of front wheel hydraulic cylinder and piston assemblies connected to the body and the front wheels, each front wheel hydraulic cylinder and piston assembly including upper and lower ports and a piston slidable between the upper and lower ports;

a pair of rear wheel hydraulic cylinder and piston assemblies connected to the body and the rear wheels, each rear wheel hydraulic cylinder and piston assembly including a cylinder with upper and lower ports and a piston slidable in the cylinder between the upper and lower ports;

hydraulic connection means for hydraulically connecting the lower ports of the front and rear wheel hydraulic cylinder and piston assemblies to the valved hydraulic signal means; and said hydraulic connection means including an expandable hydraulic fluid carrying line providing means for radially damping hydraulic pressure surges in said hydraulic connection means.

2. The anti-roll system of claim 1, wherein said expandable fluid carrying line includes a high pressure expandable damping hose.

3. The anti-roll system of claim 1, wherein said expandable fluid carrying line includes an unreinforced flexible hose covered by a flexible reinforcing sheath.

4. The anti-roll system of claim 1, wherein said expandable fluid carrying line includes a flexible hose of oblong cross-section covered by a flexible reinforcing sheath.

5. A cylinder and piston assembly, comprising:

a cylinder with upper and lower ports, each of the ports opening into the interior of the cylinder;

a piston means slidably contained within said cylinder for reciprocal, hydraulically-actuated movement within said cylinder between said ports;

a first piston port opening between each end of said piston, a first flexible port cover attached to a first end of said piston and biased against said first end of said piston to cover one end of said first port, a second piston port opening between each end of said piston, and a second flexible port cover attached to said second end and biased against said second end to cover one end of said second port; and a floating piston sealing said cylinder beneath said lower port, said floating piston disposed in the interior of said cylinder and attached to said cylinder for reciprocal movement therein about a center line substantially diametrical to said cylinder, said floating piston including primary and secondary liquid seals providing a seal between the floating piston and the interior of the cylinder.

6. The shock absorbing cylinder of claim 5, wherein the floating piston includes:

a substantially cylindrical piece with an annular indentation;

said primary and second seals being disposed in said annular indentation for providing a liquid seal between the floating piston and the interior of the cylinder;

a through-bore extending diametrically through said cylinder; and a flexible bushing disposed in the diametric bore for flexibly seating the floating piston in the cylinder.

7. A system for roll compensation in a vehicle having front and rear wheels, a frame with means for rotatably supporting said wheels, a vehicle body, and a suspension connecting the wheels to the body, said system comprising:

valved hydraulic signal means for providing a differential hydraulic signal indicative of vehicle turn direction, the differential hydraulic signal including a pressurizing hydraulic potential and a return hydraulic potential;

a pair of rear wheel hydraulic cylinder and piston assemblies acting between said body and said rear wheels;

a pair of front wheel hydraulic cylinder and piston assemblies acting between said body and said front wheels;

a hydraulic circuit connected to said valved hydraulic signal means and to said rear wheel and front wheel cylinder and piston assemblies for conducting said differential hydraulic signal to said rear wheel and front wheel cylinder and piston assemblies by providing said pressurizing hydraulic potential to move the piston in a first front wheel cylinder and piston assembly while providing the return potential to move the piston in a second front wheel cylinder and piston assembly;

tilt limitation means connected to the hydraulic circuit and the front wheel cylinder and piston assemblies for limiting the maximum displacement of the pistons in said front wheel cylinder and piston assemblies by return conduction of said pressurizing hydraulic potential; and said hydraulic circuit including an expandable hydraulic fluid carrying line providing means for dampening hydraulic pressure in said hydraulic circuit.

8. The anti-roll system of claim 7, wherein said expandable fluid carrying line includes an unreinforced flexible hose covered by a flexible reinforcing sheath.

9. The anti-roll system of claim 6 wherein said expandable fluid carrying line includes a flexible hose of oblong cross-section covered by a flexible reinforcing sheath.

10. A system for roll compensation in a vehicle having a body, wheels, and a suspension connecting the body and the wheels, the system comprising:
- a first cylinder and piston assembly attached to the vehicle between the body and a wheel on a first side of the vehicle, the first cylinder and piston assembly including upper and lower fluid ports;
- a second cylinder and piston assembly attached to the vehicle between the body and a wheel on a second side of the vehicle, the second cylinder and piston assembly including upper and lower fluid ports;
- a fluid circuit means attached to the upper and lower fluid ports of the first and second cylinder and piston assemblies and responsive to a vehicle turn for conducting fluid to compress or expand the first and second cylinder and piston assemblies;
- a first position-sensing port means in the first cylinder and piston assembly between the upper and lower ports and connected to the fluid circuit means for conducting fluid to the fluid circuit means from the first cylinder and piston assembly in response to compression or expansion of the first cylinder and piston assembly by conduction of fluid;
- a second position-sensing port means in the second cylinder and piston assembly between the upper and lower ports and connected to the fluid circuit means for conducting fluid to the fluid circuit means from the second cylinder and piston assembly in response to compression or expansion of the second cylinder and piston assembly by conduction of fluid; and
- said fluid circuit including an expandable fluid carrying line providing means for dampening fluid pressure in said fluid circuit.

11. The system of claim 10, wherein said expandable fluid carrying line includes an unreinforced flexible hose covered by a flexible reinforcing sheath.

12. The system of claim 10, wherein said expandable fluid carrying line includes a flexible hose of oblong cross-section covered by a flexible reinforcing sheath.

13. A system for roll compensation in a vehicle having a body, wheels, and a suspension connecting the body and wheels, the system comprising:
- a plurality of cylinder and piston assemblies, each cylinder and piston assembly including a cylinder with a first and second port, and a piston slidable in the cylinder between the first and second ports;
- a first pair of cylinder and piston assemblies being attached to one side of the vehicle, each of the first pair being attached between the body and a respective wheel on said one side of said vehicle;
- a second pair of cylinder and piston assemblies being attached to a second side of the vehicle, the second side being opposite the first side, each of the second pair being attached between the body and a respective wheel on said second side of said vehicle;
- a fluid circuit means connected to the first and second ports of the plurality of cylinder and piston assemblies for providing a differential fluid signal with pressurizing and return components for alternately compressing and expanding the plurality of cylinder and piston assemblies by conduction of the fluid signal to the cylinder and piston assemblies in response to a vehicle turn;
- in one cylinder and piston assembly of the first pair of cylinder and piston assemblies, a position-sensing port in the cylinder between the first and second ports of the cylinder and piston assembly and connected to the fluid circuit means for returning fluid from the cylinder and piston assembly to the fluid circuit means in response to compression or expansion of the cylinder and piston assembly;
- in one cylinder and piston assembly of the second pair of cylinder and piston assemblies, a position-sensing port in the cylinder between the first and second ports of the cylinder and piston assembly and connected to the fluid circuit means for returning fluid from the cylinder and piston assembly to the fluid circuit means in response to compression or expansion of the cylinder and piston assembly; and
- said fluid circuit means including an expandable fluid carrying line providing means for dampening fluid pressure in said fluid circuit.

14. The system of claim 13, wherein said expandable fluid carrying line includes an unreinforced flexible hose covered by a flexible reinforcing sheath.

15. The system of claim 13, wherein said expandable fluid carrying line includes a flexible hose of oblong cross-section covered by a flexible reinforcing sheath.

16. The system of claim 7, further including a hydraulic conductor directly connecting corresponding ends of said rear wheel cylinder and piston assemblies for hydraulically conducting between said rear wheel cylinder and piston assemblies in response to said differential hydraulic signal.

17. The system of claim 16, further including an accumulator in said hydraulic conductor, the accumulator comprising a substantially cylindrical device having a mid-section with a first diameter and two end sections, each of the end sections having a diameter less than the first diameter, and a flexible, air-filled bladder disposed in the mid-section.

18. The system of claim 17, further including in the fluid circuit means, a back-pressure valve including a first port for connection to a pressurizing fluid potential, a second port for connection to a return fluid potential, and a substantially cylindrical, hollowed out mid-section between said first and second ports, and a spring-loaded internal valve disposed in said mid-section and biased against said first port.

19. An active suspension system for a vehicle, comprising:
- first means for providing a hydraulic signal in response to vehicle body movement;
- second means for generating a first vehicle correcting movement in response to the hydraulic signal;
- third means for generating a second vehicle correcting movement in response to the hydraulic signal;
- hydraulic connection means connected to the first, second, and third means for conducting the hydraulic signal to the second means and third means; and
- the hydraulic means including one or more expandable fluid-carrying lines providing means for radially damping hydraulic pressure in the hydraulic connection means.

* * * * *